United States Patent [19]

Lemieux

[11] 4,183,985
[45] Jan. 15, 1980

[54] PROCESS OF PRODUCING A NONWOVEN NEEDLED NAPPED FABRIC HAVING SUPERIOR RESISTANCE TO PILLING AND SHEDDING

[75] Inventor: George W. Lemieux, Swannanoa, N.C.

[73] Assignee: National Distillers and Chemical Corporation, New York, N.Y.

[21] Appl. No.: 867,124

[22] Filed: Jan. 5, 1978

[51] Int. Cl.² ........................ B32B 5/06; D04H 18/00
[52] U.S. Cl. ...................................... 428/91; 8/115.6; 26/2 R; 28/111; 28/112; 428/96; 428/300; 428/301
[58] Field of Search ................. 28/107, 108, 109, 110, 28/111, 112, 113, 114, 115; 26/2 R; 428/91, 96, 300, 301; 8/115.6

[56] References Cited

U.S. PATENT DOCUMENTS

| | | | |
|---|---|---|---|
| 202,252 | 4/1878 | Field | 28/113 |
| 720,018 | 2/1903 | Greene . | |
| 1,743,068 | 1/1930 | Walsh | 28/111 |
| 3,074,144 | 1/1963 | Reed | 28/112 X |
| 3,260,640 | 7/1966 | Owen | 28/111 X |
| 3,288,103 | 11/1966 | Lemieux | 26/2 R |
| 3,288,553 | 11/1966 | Lemieux | 428/91 X |
| 3,337,387 | 8/1967 | Owen | 28/107 X |
| 3,395,065 | 7/1968 | Owen, Sr. | 28/111 X |
| 3,616,124 | 5/1969 | Danhel et al. | 28/111 X |
| 3,755,863 | 9/1973 | Betere | 28/111 |
| 3,889,326 | 6/1975 | Tyas . | |
| 3,906,599 | 9/1975 | Smith | 28/111 |
| 3,935,046 | 1/1976 | Kiernan et al. | 28/112 |

FOREIGN PATENT DOCUMENTS

| | | |
|---|---|---|
| 113116 | 5/1941 | Australia . |
| 211545 | 11/1957 | Australia . |
| 2054620 | 5/1972 | Fed. Rep. of Germany . |
| 2263949 | 7/1974 | Fed. Rep. of Germany . |
| 793981 | 2/1936 | France . |
| 46-3313 | 1/1971 | Japan . |
| 46-6547 | 2/1971 | Japan . |
| 6804898 | 10/1968 | Netherlands . |
| 801439 | 9/1958 | United Kingdom ............ 28/112 |

Primary Examiner—Louis Rimrodt
Attorney, Agent, or Firm—Bell, Seltzer, Park & Gibson

[57] ABSTRACT

Process of producing a nonwoven needled napped fabric, adaptable for use in the formation of blankets and other types of products, characterized by providing superior resistance to pilling and shedding of the napped fabric, as follows. A batt of textile fibers of a desired construction is sequentially needled from a first side to a second side and then from the second side to the first side thereof to form a multiplicity of fiber entanglements for interlocking the fibers of the batt with each other to form an integrated needled fabric. The first and second sides of the needled fabric are napped for producing raised fiber surfaces on each side of the fabric. The needled and napped fabric is then reneedled from the first side to the second side thereof for providing resistance to pilling and shedding of the napped fibers. Preferably, the napped sides of the needled, napped and reneedled fabric are chemically treated for providing further resistance to pilling and shedding of the napped fibers.

18 Claims, 7 Drawing Figures

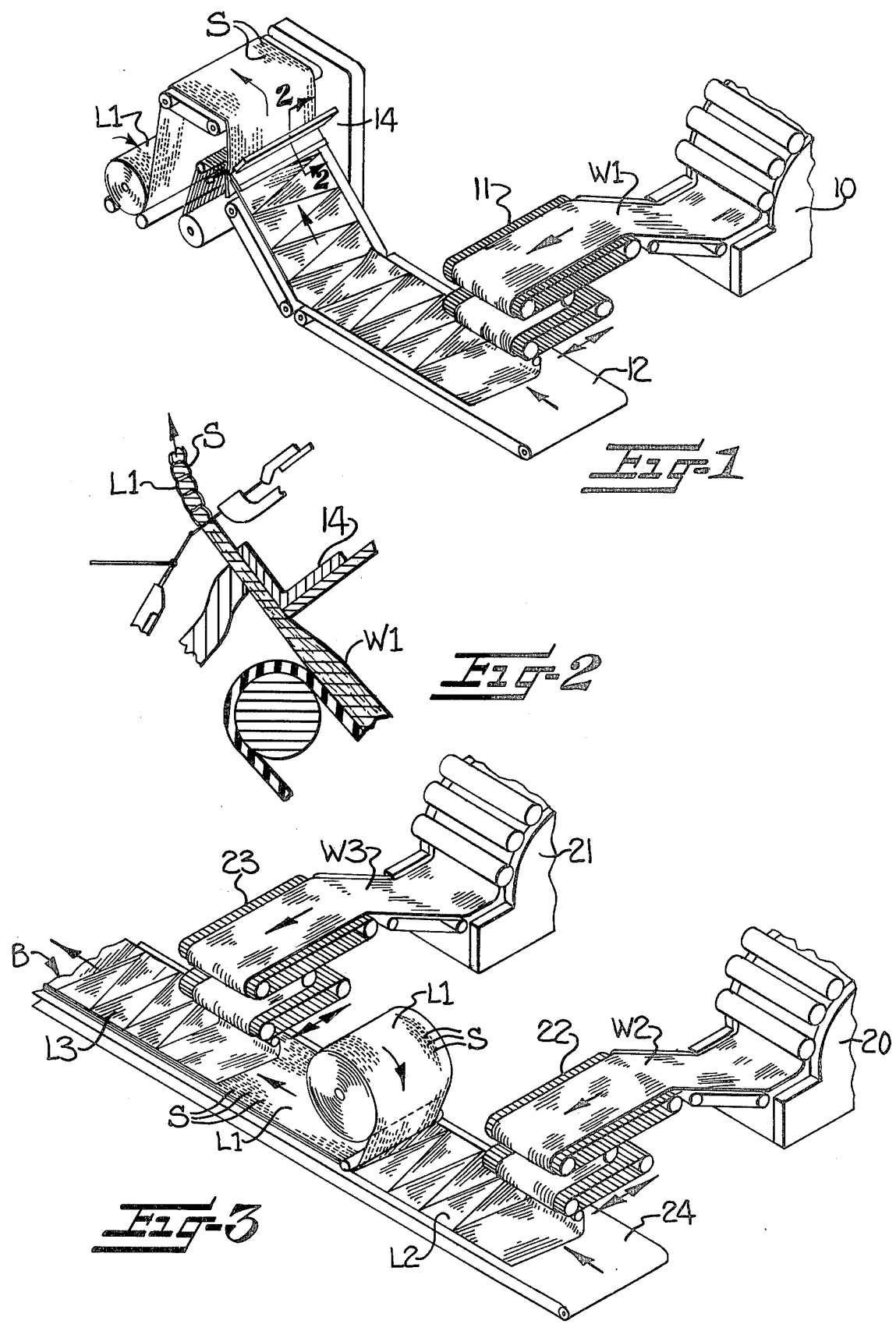

PROCESS OF PRODUCING A NONWOVEN NEEDLED NAPPED FABRIC HAVING SUPERIOR RESISTANCE TO PILLING AND SHEDDING

This invention relates to a process of producing a nonwoven needled napped fabric, adaptable for use in the formation of blankets and other types of products, which is characterized by providing superior resistance to pilling and shedding of the napped fabric.

BACKGROUND OF THE INVENTION

Nonwoven needled napped fabrics, particularly for use in the formation of blankets, outerwear, draperies, upholstery and other types of products, have become increasingly popular over the past ten to twenty years. These nonwoven fabrics utilize a batt of textile fibers of various constructions which are needled by needling apparatus or needle looms having banks of barbed needles from each side of the fabric for interlocking the fibers of the batt together and providing an integrated needled fabric which can then be napped on each of its outside surfaces for providing raised fiber surfaces to provide a fabric suitable for cutting and forming into blankets and other types of products. Such a nonwoven needled napped fabric which has been highly commercially successful is disclosed in U.S. Pat. No. 3,260,640, issued July 12, 1966, and assigned to the assignee of the present invention.

The napped sides or raised fiber surfaces of these nonwoven fabrics are conventionally chemically treated to additionally bond the raised fibers on the napped surfaces to the fabric for providing resistance to pilling and shedding of the raised fibers on the napped surfaces of the nonwoven fabric. Such chemical treatment processes for nonwoven napped fabrics are disclosed in U.S. Pat. Nos. 3,288,103 and 3,288,553, issued Nov. 29, 1966, and assigned to the assignee of the present invention.

However, even with such chemical treatments of the napped sides of the nonwoven fabrics, certain problems with pilling and shedding of the napped fibers have occurred. These problems are particularly acute in the manufacture of baby blankets in which the shedding and pilling of the loose fibers from the napped surfaces may have harmful effects on the infants utilizing such baby blankets.

OBJECTS AND SUMMARY OF THE INVENTION

Accordingly, it is the object of this invention to provide a process of producing a nonwoven needled napped fabric, adaptable for use in the formation of blankets and other types of products, which provides superior resistance to pilling and shedding of the napped fabric.

It has been found by this invention that the above object may be accomplished by providing such a process comprising generally the following steps.

A batt of textile fibers of a desired construction is provided for forming the nonwoven fabric. This batt of textile fibers may preferably be constructed in accordance with assignee's above-identified U.S. Pat. No. 3,260,640 which discloses the formation of such a batt of textile fibers comprising three layers including a supporting layer of nonwoven fibers having elongate rows of stitches therein penetrating the layer for stitch-bonding the layer together and outer layers of nonwoven fibers superimposed on each side of the supporting layer to provide the three-layer composite batt in which the fibers of each of the layers are preferably carded and cross-lapped to orient the fibers in generally the widthwise direction for providing widthwise strength and stability to the batt and in which the elongate rows of stitches extend in the lengthwise direction for providing lengthwise stability to the batt.

The batt of fibers is sequentially needled from a first side to a second side thereof and then from a second side to the first side thereof with banks of barbed needles to form a multiplicity of fiber entanglements for interlocking the fibers of the batt with each other to form an integrated needled fabric.

The first and second sides of the needled fabric are napped for producing raised fiber surfaces on each side of the fabric, preferably with a counter-pile napping machine utilizing rotating hooked needles disposed in a direction opposite to that of the flow of the fabric across the needles.

The napped and needled fabric is then reneedled with banks of barbed needles from the first side to the second side for providing resistance to pilling and shedding of the napped fibers.

Thereafter, the needled, napped and reneedled fabric is preferably chemically treated, such as by the process of assignee's above-identified U.S. Pat. Nos. 3,288,103 and 3,288,553 for providing further resistance to pilling and shedding of the napped fibers.

BRIEF DESCRIPTION OF THE DRAWINGS

Some of the objects and advantages of this invention having been stated along with a broad description of the invention, other objects and advantages will appear in conjunction with the following more specific description of the invention, when taken in conjunction with the accompanying drawings, in which:

FIG. 1 is a schematic perspective view of a preferred apparatus utilized for forming a stitched supporting layer for a three-layer batt of textile fibers for use in the process of this invention;

FIG. 2 is a schematic sectional detail, taken generally along the line 2—2 of FIG. 1, illustrating the stitching apparatus for stitching the supporting layer;

FIG. 3 is a schematic perspective view illustrating apparatus utilized for forming outer layers and superimposing these outer layers on the supporting layer to form a three-layer batt of fibers for use in the process of this invention;

DESCRIPTION OF PREFERRED EMBODIMENT

Figure 4:
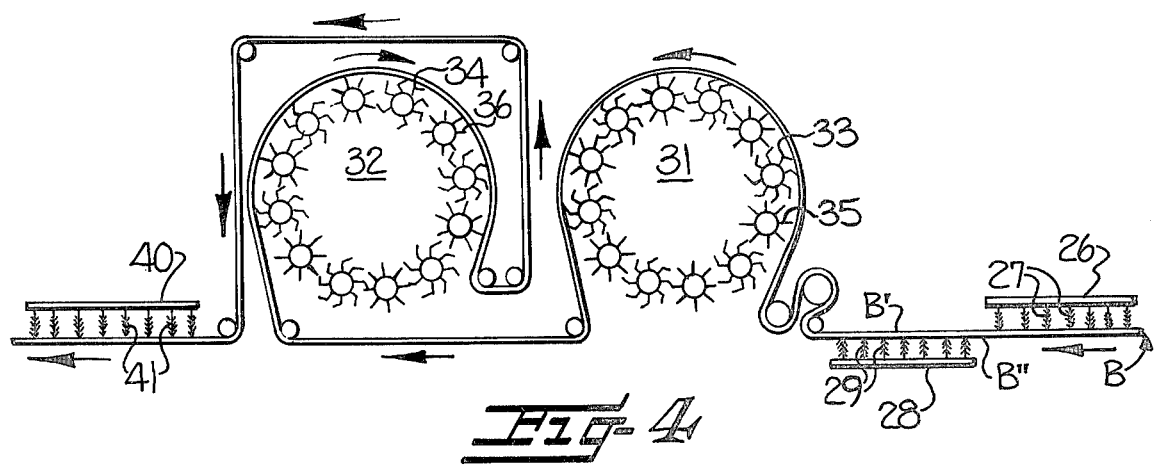
FIG. 4 is a schematic view illustrating apparatus for performing the steps of the process of this invention of needling the batt of fibers, napping the batt of fibers on each of the sides thereof and reneedling the needled and napped batt of fibers.

Referring now to the drawings, the figures thereof illustrate schematically the process of producing a nonwoven needled napped fabric F, adaptable for use in the formation of blankets and other types of products, characterized by providing superior resistance to pilling and shedding of the napped fabric. In accordance with the illustrations of the drawings, the process of this invention is shown and will be described hereinafter in connection with the use of a preferred construction of a batt B of textile fibers, i.e. a three-layer composite batt B having a stitched supporting layer L-1 and outer layers L-2 and L-3 superimposed on each side of the supporting layer L-1. However, it is to be understood that while the three-layer composite batt B is the preferred construction of a batt of textile fibers to be utilized in the process of this invention, such as disclosed in assignee's above-identified U.S. Pat. No. 3,260,640, other types and constructions of textile batts B may also be utilized in accordance with the process of this invention for providing a nonwoven needled napped fabric F having superior resistance to pilling and shedding of the napped fabric.

Referring now to FIG. 1, textile fibers are carded by a conventional carding machine 10 to form a first web W-1 of fibers. This web W-1 of fibers is cross-lapped by a conventional cross-lapping apparatus 11 onto a conveyor 12 for orienting the fibers of the first web W-1 in generally the widthwise direction of the web W-1, as indicated schematically in FIG. 1. The web W-1 is then conveyed by a conveyor 12 through a stitching machine 14, which may be an Arachne machine for forming elongate rows of chain stitches S extending generally in the lengthwise direction of the first web W-1 of fibers for forming a supporting layer L-1 having strength in both the widthwise and lengthwise direction due to the respective orientation of the rows of chain stitches S in the lengthwise direction and the orientation of the fibers through cross-lapping in the widthwise direction.

Next, carding machines 20, 21 separately card textile fibers to form separate second and third webs W-2 and W-3 of fibers. These webs W-2 and W-3 are cross-lapped by cross-lapping apparatuses 22, 23 respectively onto conveyor 24 for orienting the fibers of each in generally the widthwise directions and forming outer layers L-2 and L-3. These outer layers L-2 and L-3 are fed into superimposed relationship on each side of the supporting layer L-1 for forming a three-layer composite batt B of textile fibers of desired thickness. As may be seen in FIG. 3, the web W-2 is first cross-lapped onto the conveyor 24 to form the bottom outside layer L-2. The stitched supporting layer L-1 is then fed on top of the bottom outer layer L-2 to form a two-layer composite batt. Thereafter, the web W-3 is cross-lapped on top of the stitched supporting layer L-1 to form a three-layer composite batt B. Inasmuch as the fibers of both of the outer layers L-2 and L-3 are oriented in the widthwise directions of these layers, additional strength in the widthwise direction is imparted to the three-layer composite batt B.

Figure 7:
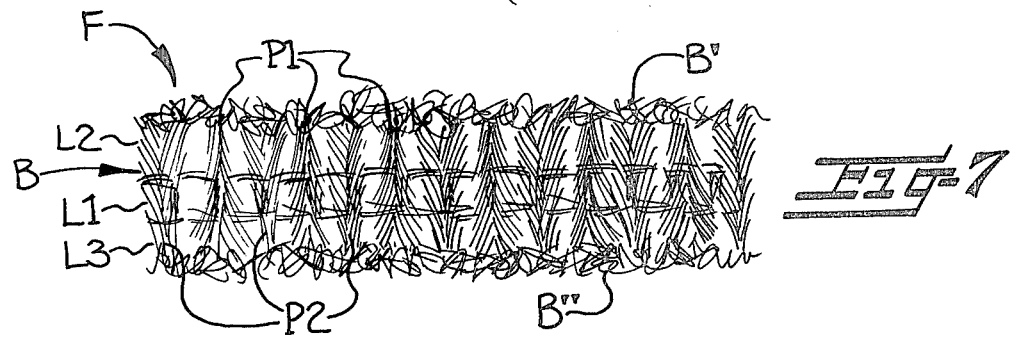
FIG. 7 is a cross-sectional view taken through the nonwoven needled napped fabric of FIG. 6.

Referring now to FIG. 4, the thus formed batt B of textile fibers is led through a first needling apparatus or needle loom 26 which includes banks of barbed needles 27 for needling the batt B of fibers from a first side B' to a second side B" for forming needle penetrations P-1 extending from the first side to the second side and indicated schematically in FIG. 7.

The batt B of fibers is then passed through a second needling apparatus 28 having banks of barbed needles 29 arranged for needling the batt B of fibers from the second side B" to the first side B' to form needle penetrations P-2 extending from the second side B" to the first side B' of the batt of fibers B, as indicated schematically in FIG. 7. These needle penetrations P-1, P-2 interlock the fibers of the batt B with each other and the layers L-1, L-2 and L-3 with each other for forming an integrated needled fabric F. It has been determined, that if the banks of needles 27, 28 of the needling apparatuses 26, 28 are arranged for forming approximately 450 needle penetrations per square inch during each needling operation for producing a multiplicity of approximately 900 fiber entanglements per square inch, the desired interlocking of the fibers of the batt B with each other and the layers L-1, L-2 and L-3 with each other may be obtained, while avoiding undue hardness and boardiness of the fabric F which would render the fabric undesirable for the formation of blankets and other types of related products in which softness and drapability are desired.

The first and second sides B' and B" of the needled fabric F are then napped with napping machines 31, 32 for producing napped or raised fiber surfaces on each side of the fabric F. Preferably, these napping machines 31, 32 are of the counter-pile type utilizing rotating hooked needles 33, 34 disposed in a direction opposite to that of the flow of the fabric across the needles for producing raised fiber surfaces on each side of the fabric F. These rotating hooked needles 33, 34 alternate with rotating straight needles 35, 36 which are utilized for feeding of the fabric F over the napping machine and do not contribute to the napping operation.

Following the above-described operations, the needled and napped fabric F is then fed through a further needling apparatus 40 having banks of barbed needles 41 arranged for reneedling of the needled and napped fabric F from the first side B' to the second side B" only to provide resistance to pilling and shedding of the napped or raised fibers on the fabric F. It has been found that, if these needles 41 of the needling apparatus 40 are arranged for forming an additional approximately 300 needle penetrations P-1 per square inch, the desired superior resistance to pilling and shedding of the napped fibers of the fabric F will be provided while preventing undue hardness and boardiness of the nonwoven fabric F which would render the fabric undesirable for use as blankets and other types of products which require softness and drapability.

Figure 5:
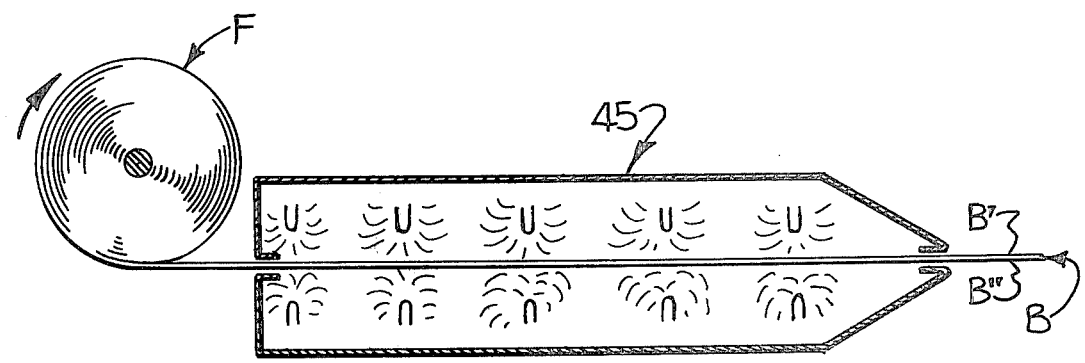
FIG. 5 is a schematic view, illustrating the further step of the process of this invention of chemically treating the needled, napped and reneedled nonwoven fabric.
Figure 6:
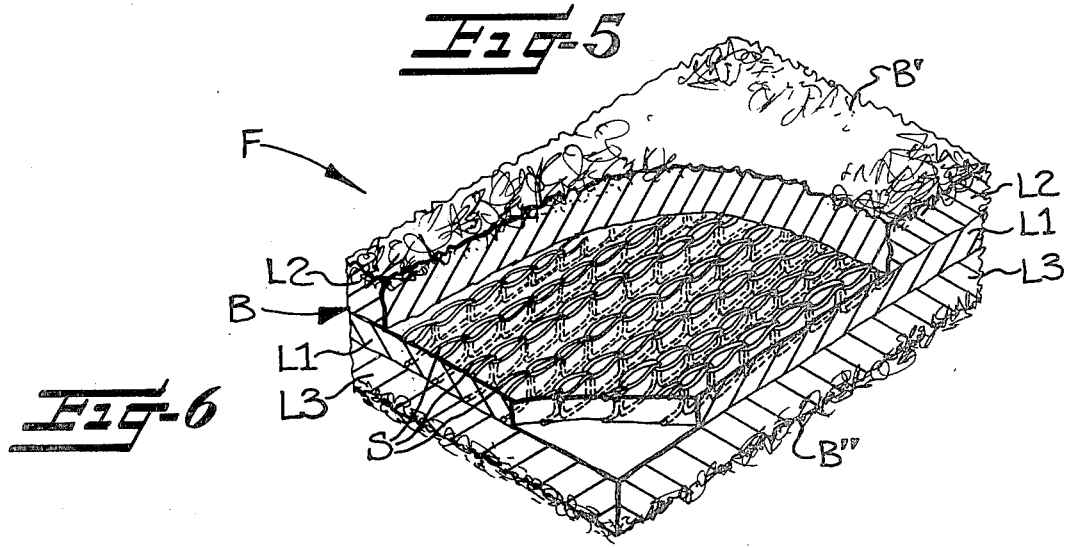
FIG. 6 is an enlarged fragmentary perspective view of the nonwoven needled napped fabric produced in accordance with the process of this invention and broken away at the various layers to illustrate the preferred composite batt of fibers utilized in the process of this invention.

Lastly, the needled, napped and reneedled fabric F is fed through a chemical treatment apparatus 45, as illustrated in FIG. 5, for chemically treating the fabric F with a desired chemical for chemically bonding the raised or napped fibers to the fabric F for providing further resistance to pilling and shedding of the napped fibers. This chemical treatment apparatus 45 and the process for chemically treating napped nonwoven fabrics is fully described in assignee's above-identified U.S. Pat. Nos. 3,288,103 and 3,288,553 and reference may be had to these patents for a full description of such a chemical treatment process. Also, other chemical treatment processes for this purpose are well known in the art and are suitable for use in the process of this invention.

The above-described carding machines 10, 20, 21, cross-lapping apparatuses 11, 22, 23, Arachne-type stitching machine 14, needling apparatuses 26, 28, 40 and napping machines 31, 32 are all well known to those with ordinary skill in the textile art and particularly the nonwoven fabric art. Accordingly, complete descriptions of the construction and operation of these machines are not believed necessary for full understanding of the present invention and will not be given herein.

In accordance with this invention, it has been found that the above-described steps, preferably in the preferred sequence described above, will provide the maximum superior resistance to pilling and shedding of the napped nonwoven needled fabric F of this invention; however, utilizing of certain combinations of these preferred steps will also produce superior resistance to pilling and shedding of a somewhat reduced nature but superior to conventional nonwoven needled napped fabrics.

For example, it has been found that if the reneedling step is performed from the second side B″ to the first side B′, rather than from the first side B′ to the second side B″, of the previously needled and napped fabric F, less resistance to pilling and shedding will be provided. It has been found that if other types of napping machines, such as a pile counter-pile napping machine utilizing rotating hooked needles disposed in both a direction opposite to that of the flow of the fabric and a direction with the flow of the fabric across the needles for forming raised fiber surfaces is utilized, then less superior resistance to pilling and shedding of the napped fabric will be produced. While the number of needle penetrations per square inch set forth above is not absolutely critical, it has been found that the preferred number of needle penetrations set forth above is preferred and will provide a product which has the desired strength, superior resistance to pilling and shedding, yet avoid undesirable boardiness and hardness of the fabric. Also, it has been found that the use of needling apparatuses which simultaneously needle from both sides of a batt B of fibers, rather than sequentially from one side and then from another, in the initial needling operation will not produce a product as superior in its resistance to pilling and shedding of the napped fibers as will a product produced as described above.

In the drawings and specification, there has been set forth a preferred embodiment of this invention, and although specific terms are employed, they are used in a generic and descriptive sense only and not for purposes of limitation.

What is claimed is:

1. Process of producing a nonwoven needled napped fabric, adaptable for use in the formation of blankets and other types of products, characterized by providing superior resistance to pilling and shedding of the nonwoven fabric, said process comprising the steps of:
    providing a multi-layer composite batt of textile fibers having an inner nonwoven supporting layer and outer layers of nonwoven fibers on each side of the supporting layer;
    sequentially needling the batt of fibers from a first side to a second side thereof and then from the second side to the first side thereof to form a multiplicity of fiber entanglements for interlocking the fibers of the batt with each other to form an integrated needled fabric;
    napping the first and second sides of the needled fabric for producing raised fiber surfaces on each side of the fabric; and
    reneedling the needled and napped fabric from the first side to the second side only thereof for providing resistance to pilling and shedding of the nonwoven fabric.

2. Process of producing a nonwoven needled napped fabric, as set forth in claim 1, in which said step of providing a batt of textile fibers comprises
    providing a supporting layer of textile fibers having elongate rows of stitches therein penetrating the layer for stitch-bonding the layer together, and
    providing outer layers of textile fibers superimposed on each side of the supporting layer to form a three-layer composite batt.

3. Process of producing a nonwoven needled napped fabric, as set forth in claim 2, in which said step of providing a supporting layer of fibers having elongate rows of stitches therein comprises
    forming a carded web of fibers,
    cross-lapping the carded web of fibers for orienting the fibers in generally the widthwise direction of the cross-lapped web, and
    stitching the cross-lapped web to form elongate rows of chain stitches extending generally in the lengthwise direction of the carded and cross-lapped web for forming a supporting layer having strength in both the widthwise and lengthwise directions.

4. Process of producing a nonwoven needled napped fabric, as set forth in claim 3, in which said step of providing outer layers of fibers superimposed on each side of the supporting layer includes
    separately carding separate webs of fibers,
    separately cross-lapping each of the carded webs of fibers to form separate cross-lapped and carded webs having the fibers of each extending generally in the widthwise direction, and
    feeding the carded and cross-lapped webs into superimposed relationship on each side of the supporting layer for providing a desired thickness to the three-layer composite batt and providing additional strength to the composite batt in the widthwise direction.

5. Process of producing a nonwoven needled napped fabric, as set forth in claim 1, in which said step of sequentially needling the batt of fibers from a first side to a second side thereof and then from the second side to the first side thereof comprises
    needling the batt of fibers with banks of barbed needles arranged for forming approximately 450 needle penetrations per square inch from the first side to the second side thereof and approximately 450 needle penetrations per square inch from the second side to the first side thereof for producing a total of approximately 900 fiber entanglements per square inch in the batt of fibers for desired interlocking of the fibers of the batt with each other to form an integrated needled fabric while avoiding undesirable hardness and boardiness of the fabric.

6. Process of producing a nonwoven needled napped fabric, as set forth in claim 1, in which said step of napping the first and second sides of the needled fabric comprises
    napping the first and second sides of the needled fabric with a counter-pile napping machine utilizing rotating hooked needles disposed in a direction opposite to that of the flow of the fabric across the needles.

7. Process of producing a nonwoven needled napped fabric, as set forth in claim 1, in which said step of reneedling the needled and napped fabric comprises reneedling the needled and napped fabric from the first side to the second side thereof only with banks of barbed needles arranged for forming approximately 300 needle penetrations per square inch to provide resistance to pilling and shedding of the napped fibers while preventing undue hardness and boardiness of the nonwoven fabric.

8. Process of producing a nonwoven needled napped fabric, as set forth in claim 1, including the additional step of chemically treating the napped sides of the needled, napped and reneedled fabric for providing further resistance to pilling and shedding of the napped fibers.

9. A nonwoven needled napped fabric produced in accordance with the process of claim 1.

10. Process of producing a nonwoven needled napped fabric, adaptable for use in the formation of blankets and other types of products, characterized by providing superior resistance to pilling and shedding of the nonwoven fabric, said process comprising the steps of:

providing a multi-layer composite batt of textile fibers having an inner nonwoven supporting layer and outer layers of nonwoven fibers on each side of the supporting layer;

sequentially needling the batt of fibers with banks of barbed needles from a first side to a second side thereof and then from the second side to the first side thereof to form a multiplicity of fiber entanglements for interlocking the fibers of the batt with each other to form an integrated needled fabric;

napping the first and second sides of the needled fabric with a counter-pile napping machine utilizing rotating hooked needles disposed in a direction opposite to that of the flow of the fabric across the needles for producing raised fiber surfaces on each side of the fabric;

reneedling the needled and napped fabric with banks of barbed needles from the first side to the second side thereof only for providing resistance to pilling and shedding of the napped fibers; and chemically treating the napped sides of the needled, napped and reneedled fabric for providing further resistance to pilling and shedding of the napped fibers.

11. Process of producing a nonwoven needled napped fabric, as set forth in claim 10, in which said step of sequentially needling the batt of fibers comprises needling the batt of fibers with the banks of barbed needles arranged for forming approximately 450 needle penetrations per square inch from the first side to the second side thereof and approximately 450 needle penetrations per square inch from the second side to the first side thereof for producing a total of approximately 900 fiber entanglements per square inch in the batt of fibers for desired interlocking of the fibers of the batt with each other to form an integrated needled fabric while avoiding undesirable hardness and boardiness of the nonwoven fabric, and said step of reneedling the napped and needled nonwoven fabric comprises reneedling with the banks of barbed needles arranged for forming approximately 300 needle penetrations per square inch to provide resistance to pilling and shedding of the napped fibers while preventing undue hardness and boardiness of the nonwoven fabric.

12. A napped nonwoven needled fabric produced in accordance with the process of claim 10.

13. Process of producing a nonwoven needled napped fabric, adaptable for use in the formation of blankets and other types of products, characterized by providing superior resistance to pilling and shedding of the napped fabric, said process comprising the steps of:

providing a batt of textile fibers having a supporting layer of nonwoven fibers including elongate rows of stitches therein penetrating the supporting layer for stitch-bonding the supporting layer together and outer layers of nonwoven fibers superimposed on each side of the supporting layer to form a three-layer composite batt;

sequentially needling the batt of fibers with banks of barbed needles from a first side to a second side thereof and then from the second side to the first side thereof to form a multiplicity of fiber entanglements for interlocking the fibers of the batt with each other to form an integrated needled fabric;

napping the first and second sides of the needled fabric with a counter-pile napping machine utilizing rotating hooked needles disposed in a direction opposite to that of the flow of the fabric across the needles for producing raised fiber surfaces on each side of the fabric;

reneedling the needled and napped nonwoven fabric with banks of barbed needles from the first side to the second side thereof only for providing resistance to pilling and shedding of the napped fibers; and chemically treating the napped sides of the needled, napped and reneedled fabric for providing further resistance to pilling and shedding of the napped fibers.

14. Process of producing a nonwoven needled napped fabric, as set forth in claim 13, in which said step of providing a batt of textile fibers includes carding textile fibers to form a first web of fibers, cross-lapping the first web of fibers for orienting the fibers in generally the widthwise direction of the first web, stitching the first web to form elongate rows of chain stitches extending generally in the lengthwise direction of the first web for forming a supporting layer having strength in both the widthwise and lengthwise directions, separately carding textile fibers to form separate second and third webs of fibers, cross-lapping each of the second and third webs of fibers for orienting the fibers of each in generally the widthwise direction of each web, and feeding the second and third webs into superimposed relationship on each side of the supporting layer for forming a three-layer composite batt of desired thickness and for providing additional strength to the composite batt in the widthwise direction.

15. Process of producing a nonwoven needled napped fabric, as set forth in claim 13, in which said step of sequentially needling the batt of fibers comprises needling the batt of fibers with the banks of barbed needles arranged for forming approximately 450 needle penetrations per square inch from the first side to the second side thereof and approximately 450 needle penetrations per square inch from the second side to the first side thereof for producing a total of approximately 900 fiber entanglements per square inch in the batt of fibers for desired interlocking of the fibers of the batt with each other to form an integrated needled fabric while avoiding undesirable hardness and boardiness of the nonwoven fabric, and said step of reneedling the needled and napped fabric comprises reneedling with the banks of barbed needles arranged for forming approximately 300 needle penetrations per square inch to provide resistance to pilling and shedding of the napped fibers while preventing undue hardness and boardiness of the nonwoven fabric.

16. A napped nonwoven needled fabric produced in accordance with the process of claim 13.

17. Process of producing a nonwoven needled napped fabric, adaptable for use in the formation of blankets and other types of products, characterized by providing superior resistance to pilling and shedding of the napped fabric, said process comprising the steps of:

providing a batt of textile fibers including carding textile fibers to form a first web of fibers, cross-lapping the first web of fibers for orienting the fibers in generally the widthwise direction of the first web, stitching the first web to form elongate rows of chain stitches extending generally in the lengthwise direction of the first web for forming a supporting layer having strength in both the widthwise and lengthwise directions, separately carding textile fibers to form separate second and third webs of fibers, cross-lapping each of the second and third webs of fibers for orienting the fibers of each in generally the widthwise direction of each web, and feeding the second and third webs into superimposed relationship on each side of the supporting layer for forming a three-layer composite batt of desired thickness and for providing additional strength to the composite batt in the widthwise direction;

sequentially needling the batt of fibers with banks of barbed needles from a first side to a second side thereof with the needles arranged for forming approximately 450 needle penetrations per square inch and then from the second side to the first side thereof with the needles arranged for forming approximately 450 needle penetrations per square inch providing a multiplicity of approximately 900 fiber entanglements per square inch for interlocking the fibers of the batt with each other to form an integrated needled nonwoven fabric;

napping the first and second sides of the needled fabric with a counter-pile napping machine utilizing rotating hooked needles disposed in a direction opposite to that of the flow of the fabric across the needles for producing raised fiber surfaces on each side of the fabric;

reneedling the needled and napped fabric with banks of barbed needles from the first side to the second side thereof only with the needles arranged for forming approximately 300 needle penetrations per square inch to provide resistance to pilling and shedding of the napped fibers while preventing undue hardness and boardiness of the nonwoven fabric; and chemically treating the napped sides of the needled, napped and reneedled fabric for providing further resistance to pilling and shedding of the napped fibers.

18. A napped nonwoven needled fabric produced in accordance with the process of claim 17.

* * * * *